US009459772B2

(12) United States Patent
Nihal

(10) Patent No.: US 9,459,772 B2
(45) Date of Patent: Oct. 4, 2016

(54) SYSTEMS AND METHODS FOR PROVIDING REMOTE COMMUNICATIONS AND VISITATIONS

(76) Inventor: Perwaiz Nihal, Dublin, NH (US)

( * ) Notice: Subject to any disclaimer, the term of this patent is extended or adjusted under 35 U.S.C. 154(b) by 165 days.

(21) Appl. No.: 14/009,564

(22) PCT Filed: Apr. 9, 2012

(86) PCT No.: PCT/US2012/032817
§ 371 (c)(1),
(2), (4) Date: Oct. 3, 2013

(87) PCT Pub. No.: WO2013/058826
PCT Pub. Date: Apr. 25, 2013

(65) Prior Publication Data
US 2014/0033051 A1     Jan. 30, 2014

Related U.S. Application Data

(60) Provisional application No. 61/473,801, filed on Apr. 10, 2011.

(51) Int. Cl.
G06F 3/048     (2013.01)
G06F 3/0484    (2013.01)
G06Q 10/10     (2012.01)

(52) U.S. Cl.
CPC .............. *G06F 3/0484* (2013.01); *G06Q 10/10* (2013.01)

(58) Field of Classification Search
CPC .......................... G06F 19/322; G06F 19/3418
See application file for complete search history.

(56) References Cited

U.S. PATENT DOCUMENTS

| 5,997,476 A | 12/1999 | Brown |
| 6,168,563 B1 | 1/2001 | Brown |
| 7,197,467 B2 | 3/2007 | Labadie |
| 7,256,816 B2 | 8/2007 | Profanchik et al. |
| 7,477,285 B1 | 1/2009 | Johnson |
| 7,650,291 B2 | 1/2010 | Rosenfeld et al. |

(Continued)

FOREIGN PATENT DOCUMENTS

KR   10-2004-0085798     10/2004

OTHER PUBLICATIONS

Oh, Eung Gie, International Search Report and Written Opinion for parent International Application PCT/US2012/032817, Mailed Apr. 9, 2012, 12 pages, Korea.

*Primary Examiner* — William Bashore
*Assistant Examiner* — Rayeez Chowdhury
(74) *Attorney, Agent, or Firm* — John Brooks Law LLC; John J Brooks, III

(57) ABSTRACT

Processor based systems and methods for providing a communication between a first and a second user are disclosed, one example method comprising receiving a first service request from the second user interface, authorizing a first communication type to the second user interface and the first user interface based on a profiles of a service provider profile, the first user and the second user profile, and providing the first communication type as the communication. In some embodiments, the systems and methods further comprise providing a notification to at least one of the first user interface or the second user interface of a service event based on the service provider profile. In some embodiments, the step of authorizing the communication service based on a service provider profile comprises comparing the service request to at least one service provider profile attribute.

20 Claims, 14 Drawing Sheets

(56) References Cited

U.S. PATENT DOCUMENTS

| | | | |
|---|---|---|---|
| 2003/0046108 A1* | 3/2003 | Labadie | G06Q 30/02 705/2 |
| 2006/0087554 A1* | 4/2006 | Boyd | H04N 7/15 348/14.09 |
| 2006/0173708 A1 | 8/2006 | Vining et al. | |
| 2007/0271122 A1 | 11/2007 | Saleski | |
| 2008/0048826 A1* | 2/2008 | Agrawal | G06F 19/327 340/5.61 |
| 2008/0065414 A1* | 3/2008 | Schoenberg | G06Q 10/109 705/2 |
| 2009/0093688 A1 | 4/2009 | Mathur | |
| 2009/0240521 A1 | 9/2009 | Simons et al. | |
| 2009/0281833 A1* | 11/2009 | Boppana | G06F 19/3425 705/3 |
| 2009/0319298 A1* | 12/2009 | Weiss | G06F 19/322 705/3 |
| 2010/0128104 A1* | 5/2010 | Fabregat | H04N 7/147 348/14.03 |
| 2010/0222649 A1* | 9/2010 | Schoenberg | G06F 19/3418 600/301 |
| 2011/0179180 A1* | 7/2011 | Schleifer | H04L 12/1818 709/227 |
| 2012/0008757 A1* | 1/2012 | Fried | H04M 1/72519 379/202.01 |

* cited by examiner

290 Receiving a Communication.

294 Receiving a notification of a service event based on a service provider profile of the service provider.

291 Recognizing a second user input to a user interface as a first service request for a first communication type with the first user interface.

292 Communicating the first service request from the second user interface to a service provider.

293 Receiving the first communication type between the first user interface and the second user interface after the service provider provides a first authorization to receive the first communication type based on a service provider profile, a first user profile and a second user profile.

295 Recognizing a second user input to a user interface as a second service request for a second communication type with the first user interface.

296 Communicating the second service request for a second communication type from the second user interface.

297 Receiving the second communication type between the first user interface and the second user interface after the service provider provides a second authorization to receive the second communication type based on the service provider profile, the first user profile and the second user profile.

FIG. 2C

SYSTEMS AND METHODS FOR PROVIDING REMOTE COMMUNICATIONS AND VISITATIONS

CROSS-REFERENCE TO RELATED APPLICATIONS

This application claims benefit of U.S. Pat. App. No. 61/473,801 filed Apr. 10, 2011 entitled "SYSTEMS AND METHODS FOR PROVIDING REMOTE COMMUNICATIONS AND VISITATIONS", the entire contents of which are incorporated by reference in their entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field

Disclosed embodiments relate generally to communication methods and systems, in particular systems and methods that allow communication and visitation services between remote users.

2. Background

There are many situations where regular communication between people or monitoring of situations can provide benefits. For example, in a business environment, it is helpful to have regular meetings with people involved with a project to ensure progress is being made. For some of those meetings, regular on-going communication is helpful and in some instances it is more helpful to be physically present during the communication so that the meeting is more interactive and so that attendees may be able to benefit from visual cues made by participant. However, it is not always possible to be physically present and other types of communications, such as audio, text or video conferencing may be able to provide a suitable alternative to being physically present.

In a health care environment, such as when a patient is in a hospital, family members are usually interested in visiting them. However, it is not always possible for family members to visit. Some family members may be very far from the hospital and cannot travel to visit. Some family members may not be able to visit during the specific visiting hours and may have to forego a visit. Audio communications, such as phone calls may be made but sometimes other types of communication with the patient may be more helpful. Having a phone conversation with visitors requires a good understanding of how use the features of your phone or setting up a conference call. Video communications over a computer or digital phone may also be made, but the ability of the patient to manipulate controls of a computer or phone may be limited due to their physical condition. The complexity of having the patient control the conversation with prior art devices increases as multiple parties want to communicate with the patient at the same time. Having different types of communications with the patient makes coordinating the conversations even more difficult.

In addition to visiting a patient in a hospital, visitors may be interested in monitoring the patient even outside of the visiting hour period without interrupting the patient. The visitors may also be interested in having a communication amongst themselves without interrupting or sharing these discussions with the patient.

From the patient's point of view, with the difficulty they may have in manipulating the devices and interfaces to establish multiple types of communications, patients may be interested in pre-defining a user profile that can provide an authorization for the different types of communications.

Accordingly, what is needed are methods and systems that provide consolidated remote communications and visitations features that address the shortcoming found in the prior art.

BRIEF SUMMARY OF THE INVENTION

The following summary is included only to introduce some concepts discussed in the Detailed Description below. This summary is not comprehensive and is not intended to delineate the scope of protectable subject matter, which is set forth by the detailed description and the claims presented at the end.

In an example embodiment, a processor based method of providing a communication between a first user interface and a second user interface is provided, the method comprising receiving a service request from a user interface, authorizing a communication type to the second user interface and the first user interface based on a service provider profile, a first user profile or a second user profile and providing the first communication type as the communication between the first user interface and the second user interface.

In an example embodiment, a processor based method of providing a communication between a first user interface and a second user interface is provided, the method comprising receiving a first service request from the second user interface, authorizing a first communication type to the second user interface and the first user interface based on a service provider profile, a first user profile and a second user profile and providing the first communication type as the communication between the first user interface and the second user interface. In some embodiments, the first communication type is a one-way image communication type. In some embodiments, the methods further comprise providing a notification to at least one of the first user interface or the second user interface of a service event based on one of the service provider profile or the first user profile. In some embodiments, the methods further comprise registering a first user to create the first user profile, registering a second user to create the second user profile, associating the first user profile with the first user interface, associating the second user profile with the second user interface and the step of authorizing the communication type based on a service provider profile comprises comparing the service request to at least one service provider profile attribute.

In an example embodiment, a processor based method of providing a communication between a first user interface and a second user interface is provided, the method comprising receiving a first service request from the second user interface, authorizing a first communication type to the second user interface and the first user interface based on a service provider profile, a first user profile and a second user profile and providing the first communication type as the communication between the first user interface and the second user interface. In some embodiments, the first user profile comprises a plurality of user profile attributes, at least one of the plurality of user profile attributes defines a communication group and the step of authorizing the first communication type to the second user interface and the first user interface based on the service provider profile, the first user profile and the second user profile further comprises confirming that the second user profile is in the communication group. In some embodiments, the step of authorizing the first communication type further comprises forwarding a notice of the first service request to the first user interface and receiving an acceptance of the first service request from the first user interface. In some embodiments, the methods further comprise receiving a cancel request from the first user interface to stop the first communication type and stopping the providing of the first communication type. In some embodiments, the methods further comprise authorizing the first communication type to a third user interface and the first user interface based on the service provider profile, the communication group and a third user profile, authorizing a second communication type to the third user interface and the second user interface based on the service provider profile, the communication group and the third user profile and providing the second communication type as a communication between the third user interface and the second user interface. In some embodiments, the service provider profile comprises a health care provider profile of a health care provider, the first user interface is associated with the first user profile and the first user profile is associated with of a patient of the health care provider, the second user interface is associated with the second user profile and the second user profile is associated with of a visitor of the patient of the health care provider, the third user interface is associated with the third user profile and the third user profile is associated with a second visitor of the patient of the health care provider, providing the first communication type comprises providing a one-way image communication and providing the second communication type comprises providing a two-way text communication between the second user interface and the third user interface whereby the first user interface is not provided the second communication type.

In an example embodiment, a processor based method of providing a communication between a first user interface and a second user interface is provided, the method comprising receiving a first service request from the second user interface, authorizing a first communication type to the second user interface and the first user interface based on a service provider profile, a first user profile and a second user profile and providing the first communication type as the communication between the first user interface and the second user interface. In some embodiments, the methods further comprise receiving a second service request from the second user interface for a second communication type between the second user interface and the first user interface, authorizing a second communication type based on the service provider profile, the first user profile and the second user profile and providing the second communication type between the first user interface and the second user interface. In some embodiments, the step of authorizing the second communication type is further based on a service event based on the service provider profile, the service provider profile comprises a health care provider profile of a health care provider, the first user interface is associated with the first user profile and the first user profile is associated with a patient of the health care provider, the second user interface is associated with the second user profile and the second user profile is associated with of a visitor of the patient of the health care provider, the service event is a time period for allowing the visitor to visit the patient, the first communication type is a one-way communication type from the first user interface to the second user interface and the second communication type is a two-way communication type between the second user interface and the first user interface. In some embodiments, the first communication type comprises a one-way image communication from the patient to the visitor, the second communication type comprises a two-way image communication between the patient and the visitor and the communication further comprises a communication of one or more health measures of the patient.

In one example embodiment, a processor based method for receiving a communication from a first user interface is provided, the method comprising recognizing a second user input to a second user interface as a first service request for a first communication type with the first user interface, communicating the first service request from the second user interface to a service provider and receiving the first communication type between the first user interface and the second user interface after the service provider provides a first authorization to receive the first communication type based on a service provider profile of the service provider, a first user profile and a second user profile. In some embodiments, the methods further comprise receiving a notification of a service event based on the service provider profile, communicating a second service request for a second communication type from the second user interface and providing the second communication type between the first user interface and the second user interface after the service provider provides a second authorization to receive the second communication type based on the service provider profile, the first user profile and the second user profile. In some embodiments, the service event is a defined time period for the second communication type, the first communication type is a one-way image communication from the first user interface to the second user interface, the second user interface is a graphic user interface and the second communication type is a two-way image communication between the first user interface and the second user interface. In some embodiments, the service provider profile comprises a health care provider profile of a health care provider, the first user interface is associated with a patient of the health care provider, the second user interface is associated with a visitor of the patient and the service event is a time period for allowing the visitor to visit the patient.

In one example embodiment, a processor based method is provided, the method comprising, receiving a first service request from a second user interface for a first communication type with a first user interface, receiving an acceptance of the first service request from the first user interface after receiving a first authorization to receive the first communication type based on a service provider profile, a first user profile and a second user profile and providing the first communication type from the first user interface. In some embodiments, the methods further comprise presenting the first service request for the first communication type from the second user interface and accepting the service request from the second user interface through the first user interface authorizing the communication type. In some embodiments, the methods further comprise receiving a notification of a service event, the first service request is related to the service event and the service event is a time period allowing the first communication type. In some embodiments, the service provider is a health care facility, the first user interface is associated with a patient in the health care facility, the second user interface is associated with a visitor of the first user and the service event is a visiting time period for the health care facility.

In an example embodiment, a system of providing a communication between a first user interface and a second user interface is provided, the system comprising an input module configured to receive a first service request from the second user interface, a service module configured to authorize a first communication type to the second user interface and the first user interface based on a service provider profile, a first user profile and a second user profile and an output module configured to provide the first communication type as the communication between the first user interface and the second user interface. In some embodiments, the first user profile comprises a plurality of user profile attributes, at least one of the plurality of user profile attributes defines a communication group and the service module is further configured to confirm that the second user profile is in the communication group. In some embodiments, the service module further comprises a notice module configured to output a notice of the first service request to the first user interface and an authorization receipt module configure to receive the acceptance of the first service request from the first user interface. In some embodiments, the system further comprises a stop module configured to stop the providing of the first communication type after receiving a cancel request from an input module. In some embodiments, the service module is configured to authorize the first communication type to a third user interface and the first user interface based on the service provider profile, the communication group and a third user profile, and authorize a second communication type to the third user interface and the second user interface based on the service provider profile, the communication group and the third user profile and the communication modules are configured to provide the second communication type as a communication between the third user interface and the second user interface. In some embodiments, the service provider profile comprises a health care provider profile of a health care provider, the first user interface is associated with the first user profile and the first user profile is associated with of a patient of the health care provider, the second user interface is associated with the second user profile and the second user profile is associated with of a visitor of the patient of the health care provider, the third user interface is associated with the third user profile and the third user profile is associated with of a second visitor of the patient of the health care provider, the first communication type comprises a one-way image communication and the second communication type comprises a two-way text communication between the second user interface and the third user interface whereby the first user interface is not provided the second communication type.

In an example embodiment, a computer program product is provided comprising a computer usable medium having a computer readable program code embodied therein, said computer readable program code adapted to be executed to implement a method for providing a communication between a first user interface and a second user interface, said method comprising the steps of: receiving a first service request from the second user interface, authorizing a first communication type to the second user interface and the first user interface based on a service provider profile, a first user profile and a second user profile and providing the first communication type as the communication between the first user interface and the second user interface.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2C illustrates a process diagram of example embodiments of receiving a communication;

DETAILED DESCRIPTION OF THE INVENTION

Systems and methods to provide remote communications and visitations will now be described in detail with reference to the accompanying drawings. It will be appreciated that, while the following description focuses on methods and systems that provide service remote communication and visitations between a hospital patient and an interested party such as a family member, the systems and methods disclosed herein have wide applicability. For example, the remote communications and visitation systems and methods described herein may be readily employed to provide communication between any interested party and remote environments such as but not limited to retail stores, restaurants, schools, day care centers, nursing homes, homes with children and remote family members, animal kennels, construction project sites, facility management sites or any other environment where there is an entity at a remote site and an entity at another site desiring communication between the two sites. Notwithstanding the specific example embodiments set forth below, all such variations and modifications that would be envisioned by one of ordinary skill in the art are intended to fall within the scope of this disclosure.

Figure 4:
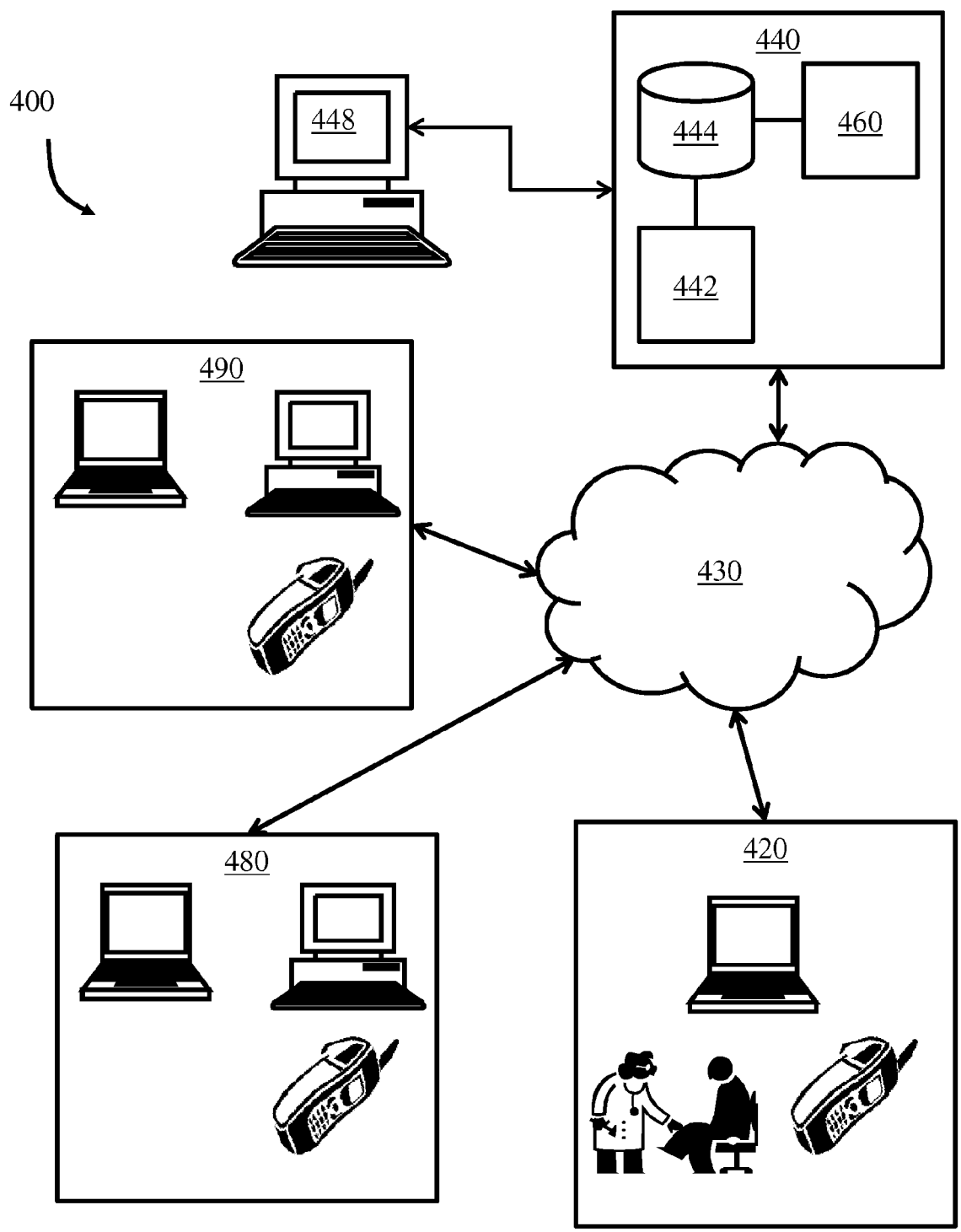
FIG. 4 illustrates an overview of the elements of one embodiment of a system for providing remote communications and visitations.

One Embodiment of Methods of Providing Remote Communications and Visitations (RCV):

One embodiment of the remote communications and visitations (RCV) methods is performed over a data communications network using a client-server architecture as illustrated in FIG. 4. As shown in FIG. 4, for illustration only and not for limitation, the methods comprise the use of a client device providing a first user interface 420 for a first user, a client device providing a second user interface 480 for a second user and a communication service system 440 that provides communication between the two users over a communication network 430.

As used throughout this description, the communication types may comprise any type of communication such as but not limited to audio, image, text, multimedia either alone or in any combination.

Figure 1:
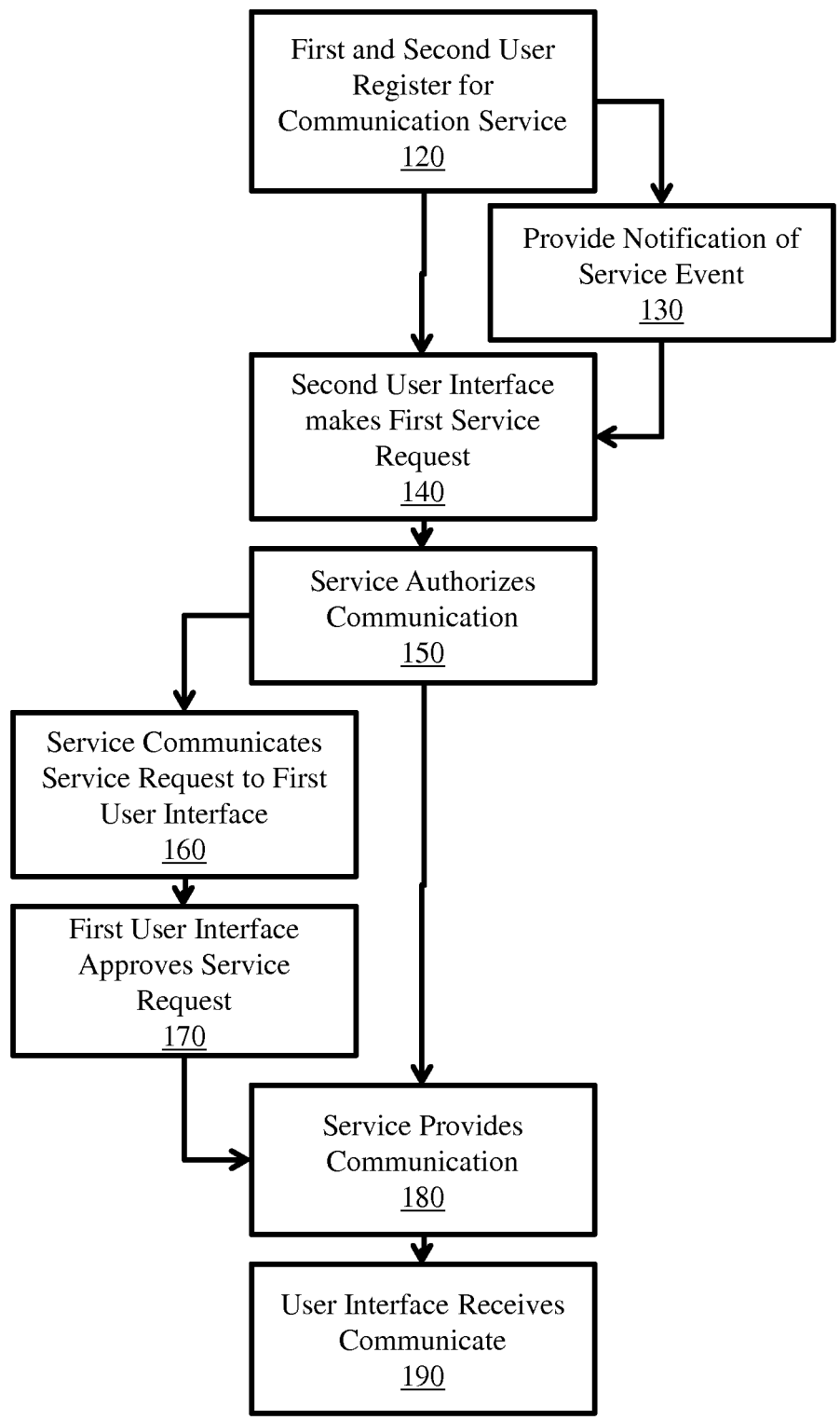
FIG. 1 illustrates a process diagram of a one generic embodiment of the methods for providing remote communications and visitations.

An overview of one example embodiment of the methods to provide a communication between users is shown in FIG. 1. As shown, the RCV methods start with at least one of the users registering for the RCV service. As part of the registration service, a user interface is made available for users to access features of the RCV service. The user interface may be a specifically configured device such as a mobile phone, iPod, iPad, laptop computer, tablet computer, desktop computer or other processor based device. The user interface may also be a software client for use on a generic processor based device and the interface may be a web-based interface for use through a generic software package such as an Internet web browser.

After the methods start, the first user may register for the service at 120. As part of the registration, the first user creates a first user profile with the communication service. The first user profile may also be associated with a service provider profile which may be the communication service provider or a separate service provider. The first user profile may also include user profile attributes that can provide an authorization for other users to have communication types provided with them and other users based on that first user profile. For example, the first user may be a patient in a hospital and the service provider may be the hospital. As another example, the first user may be a patient in a hospital and the service provider may be a business that provided the communication service between patients in the hospital and other service users.

The first user profile attributes may also comprise a communication group defining a group of other users that they will allow certain communication types with the first user and with other users. This communication may be used to pre-define the list of services for certain users.

Other users may also register for the service at 120. These other users will create their own user profile that contains information about that user and that will allow a comparison to be made between that user's profile, other users and the service provider profile. To be part of the communication group that can communicate based on the first user's profile, the first user may have user profile attributes or other information in their user profile that provides the authorization for them to communicate with that group. For example, where the first user is a hospital patient, the communication group may be the family members that the patient wants to communicate with and the first users profile may have user profile attributes that identify or list those users as belonging to the communication group. The communication group may also include other users such as other doctors of the patient or other service users who may be interested in the patient's progress.

The profiles of the different entities, the first user, the second user and the service provider, also enable the RCV methods to associate each of these entities, through their profile, with a user interface and the service. For example, the first and second user each create a user profile that includes a user name and password to a web based portal of the service provider. Other attributes may also be created that become attributes in their user profile. The users are then able to access the service through devices that connect to the RCV service such as through logging in to an Internet based portal. The log in attributes associate the user logging in to that user profile. The service also associates that user profile to that user interface for that log in session so that the user and user interface can be authorized for and receive communication types from the service for that session. As discussed later, the step of authorizing the communication types may comprise comparing a service request from that user interface to attributes of the user profile or the service provider profile.

Other methods of associating a user interface with a user profile and a user are also contemplated such as but not limited to associating a user profile with an assigned interface device and associating the device hardware or network characteristics with the user profile or recognizing other attributes of an interface device, such as a network address of a phone number of a mobile device, and associating that user interface with the user profile.

Referring back to FIG. 1, once the first user and second user are registered at 120 and associated with a user interface, the second user is able to make a service request for communication between them and the first user and first user interface at 140. The request is made through the user interface and may include service request attributes. The second user interface recognizes the user input as a service request for a first communication type with the first user interface and communicates this service request to a service provider. At 150, the service provider provides an authorization to receive the first communication type based on the service provider profile, the first user profile and the second user profile, the communication is provided at 180 and the second user interface receives the first communication type from the first user interface at 190.

At 150, to provide a communication between the first user interface and the second user interface, the methods comprise receiving the first service request from the second user interface, authorizing a first communication type to the second user interface and the first user interface based on a service provider profile, the first user profile and the second user profile and then providing the first communication type as the communication between the first user interface and the second user interface. The step of authorizing the communication type based on the service provider profile and the first and second user profile is a check performed to ensure the request is consistent with these profiles. For example, checks will be performed to ensure that the first user has identified the second user as a member of their communication group. This recognition may be based on an attribute in the first user profile that includes a list of preapproved users to accept requests from and comparing user profile attributes of the second user profile to those user profile attributes in the first user profile. The first user profile may include profile attributes that also allow for requests to be made from users with certain characteristics such as certain Facebook information or any other attributes from information sources such as social media websites. The first user profile may also have user profile attributes that block certain users from accessing the service and making requests. Similarly, the second user may have user profile attributes that are checked prior to providing communication services. For example, the second user may have to be registered with contact information before the request is authorized. The step of authorizing the communication type based on a service provider profile may also comprise comparing the service request to the service provider profile. This comparison is a check to ensure requests are consistent with the service provider profile such as whether the service request is within the type of services of that service provider and within the services authorized for that user. The comparison may be any type of comparison such as a comparison of request attributes to a predefined list of service provider profile attributes listed as database fields associated with that service provider. For illustration only and not for limitation, the service provider may limit certain types of communication during certain times or may have different tiers of service that user register and pay for. The authorization may be a comparison to database entries correlating to these types of service differences.

It is also understood that the authorizations may not be provided uniquely for every service request. For example, authorizations may be provided initially as the user registers or logs in for the service and the service request authorization is provided by the user staying logged in and maintaining that communication session.

At step 180, after receiving the authorization, the RCV methods provide the communication between the first user interface and the second user interface. Communication provided by these methods may be of any type of communication to, from or between user interfaces to include video, text, still images, audio or any combination in real time or with some delay and one-way or two-way communication. In one embodiment, the first communication type is a one-way image communication type from the first user to the second user.

In some embodiments, the methods may further comprise the first user being able to further authorize a communication. At step 160, in these embodiments, the service provider forwards the first service request from the second user interface where the first user is presented the service request and is able to decide whether to accept or authorize the communication type. The first user interface receives an acceptance of the first service request from the user and approves the request at 170. In this embodiment, the first user interface receives the first service request from the second user interface for the first communication type. The first user, through the first user interface, is then able to accept the request by providing an approval for the communication and then the communication type is provided by the service and first user interface at 180. Optionally, another authorization may be provided by the service provider which bases this other authorization on the profiles of the service provider, the first user and the second user.

Optionally within these methods, the RCV methods may be able to recognize service events and share notifications of the events with users of the service. In these embodiments, at step 130, the RCV methods recognize and communicate a notification of a service event to the users through their user interface. In some embodiments, the service shares the notifications based on the service provider profile. In these embodiments, the methods further comprise providing a notification to at least one of the first user or the second user interfaces of a service event based on the service provider profile or the first user profile. The event may be any type of event such as but not limited to a defined period of time, a special meeting time, a visit time, start or end of an activity or a request from a particular user or group of users. The service event may also be based on user profile attributes from one or more of the user's profiles.

In embodiments that share notifications of events with users, these notifications may be received by users. In some embodiments, the second user interface may receive the notification of the service event based on the service provider profile. The second user may then communicate a service request for another communication through their user interface, and the methods may provide this communication type between the first and second user interfaces after another service authorization is received, based on the profiles of the service provider and the users. For example, the second user interface may receive the notification and request and receive a two-way video communication with the first user.

Embodiments of the methods may also allow a different type of communication to be provided. These different types of communications may be authorized and provided based on the profiles of the service provider and the users. For example, the second user interface may request another communication type. The first user interface may receive a service request for the other communication type, and the methods may provide this communication type between the first user and the second user interface after another service authorization is received based on the profiles of the service provider and the users. For example, the first user interface may receive the service request from the second user interface, and once accepted by the first user interface, a two-way video communication may be provided between the two user interfaces.

In some embodiments, the step of authorizing the second communication type may be further based on a service event based on the service provider profile. For example, the second user interface may receive a notification of a service event and this service event allows for the second communication type. As an example, the service provider profile is the profile of a health care provider, the first user interface and first user profile is associated with a patient of the health care provider, the second user interface and second user profile is associated with a visitor of the patient and the service event is a time period for allowing the visitor to visit the patient at the health care provider. In one example of this embodiment, the first communication type may be a one-way communication type from the patient to the remote visitor and the second communication type may be a two-way communication, such as a video chat, between the remote visitor and the patient.

The different types of communication types may also have to be requested and authorized, to include users optionally being able to approve or accept the communication, as was described herein for the first communication type.

Although not shown in FIG. 1, the RCV methods may also provide the ability to have a third user communicate with other users through a third user interface. For example, a third user interface may be able to have a communication type with the second user interface. In these embodiments, the methods receive the third service request from the third party interface, and the methods authorize the first communication type between the first user and the third user based on the service provider profile, the first user profile and the third user profile. In some embodiments, another communication type may be provided between the third user interface and the second user interface based on the profiles of the service provider and the first, second and third user. This new communication type may or may not be shared with the first user interface and the first user. For example, one communication type may be provided as the first communication type between the first and second and the first and third user interface while another communication type may be provided as the new communication type between the second and the third user interface which is not shared with the first user interface. In this example, any communications types may be used, but for illustration, the first communication type may be one-way video from the first user interface to the second and third user interfaces and the new communication type may be text only between the second and third user interface. This configuration can be extended to multiple users and interfaces beyond this example of three.

One illustrative embodiment of the RCV methods of FIG. 1 uses a specific example situation of the first user being a patient in a remote hospital and the second user being at least one family member interested in communicating with the first user. When the users register with the service, they may have one or more user profile attributes that identify them with a service provider and aligns them with a service provider profile. The user may also have one or more user profile attributes that identify that user profile being associated with a user that belongs to the communication group of another user profile associated with another user. Once registered for the service, the service is able to associate users and user profiles with user interfaces and authorize communication with one or both users. In this example, the patient and the family member log in to access the RCV service through an interface such as an Internet browser. For the patient in the hospital, they may be logged in upon check in and stay logged in to the service. With the input of the user profile attributes associated with their log in, the RCV service associates that user interface with the attributes of the user profile used to log in. And as described above, the patient and the family member are provided communications types according to the methods of the service. For example, the family member may view a one-way video feed from the patient's bedside if they receive authorization from the service.

The RCV methods may also be aware of service events such as when visiting hours are for that patient. Using this specific example embodiment, a notification is sent to at least the family member of the beginning of visiting hours. The event of visiting hours is an attribute of the service provider profile and the attribute is used to provide an authorization for certain communication types. For example, if the service event is a time period for allowing patient visitors at a health care provider, such as hospital visiting hours, and a request for a two-way communication is received outside of this time, the communication is not authorized or provided. However, if the request is received within the time period allowing visitors, the communication is allowed. Because of this, the notification of the event to users may be helpful.

Although notifications may be provided through the RCV service interfaces, it is also understood that notifications may be provided through an integration of the RCV service with other client devices and user interfaces. For example, notifications may be sent from the RCV service to an interface such as a user's phone as a phone call or text message, to a user's computer as an email message, to a user's pager as a page or any other similar type of device capable of receiving a notification.

In this embodiment, with this notification, the family member uses their user interface, which may be an internet client, to request a communication/conversation with the remote patient. If authorized by the RCV service based on system profiles, the service may initiate a communication request approval interface on the patient's user interface, which may be an identification of the family member and a menu of selections to accept or ignore the request or to send a message in response to the request. Within this communication request approval interface, the patient is able to accept the conversation which provides an authorization for the communication type.

The RCV methods recognize this authorization and then allow communication between the two users. In this example, the communication may be a one-way streaming video or an intermittent still image of the patient being transmitted to the family member's desktop.

Additional communication types may be provided consistent with the methods described herein.

The methods outlined through the example embodiment of FIG. 1 may be performed by different portions of an RCV system and performed by different users or systems.

Figure 2A:
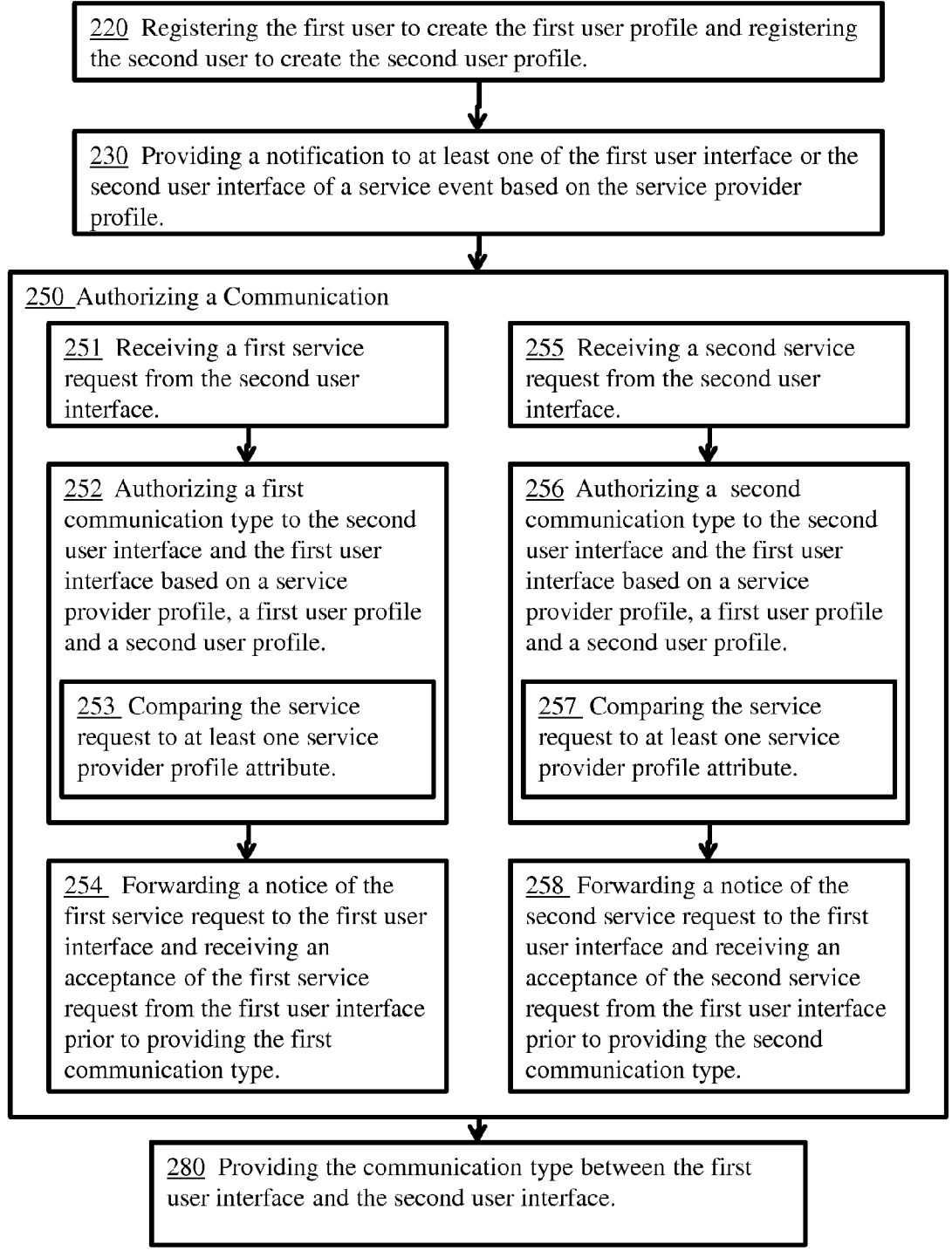
FIG. 2A illustrates a process diagram of an example embodiment of methods of providing remote communications and visitations.

FIG. 2A illustrates how some embodiments of the methods may be performed by the RCV system, for example from the point of view of a service system of a service provider. At step 250, the service system authorizes the communication types. This may comprise the steps of receiving a first service request from the second user interface at step 251, authorizing a first communication type to the second user interface and the first user interface based on a service provider profile, a first user profile and a second user profile at step 252. Optionally, embodiment may further comprise forwarding a notice of the service request to the first user interface and receiving an acceptance of the second service request from the first user interface prior to providing the second communication type at step 254. Embodiments may also comprise the steps of receiving a second service request from the second user interface at step 255, authorizing a second communication type to the second user interface and the first user interface based on a service provider profile, a first user profile and a second user profile at step 256, and optionally forwarding a notice of the second service request to the first user interface and receiving an acceptance of the second service request from the first user interface prior to providing the second communication type at step 258. As shown at steps 253 and 257, the steps of authorizing the communication type based on the profiles of the service provider or the users may be done by comparing the service requests to profile attributes of the service provider or the user profile attributes. As shown at step 280, this embodiment may also comprise providing the communication type between the user interfaces. As shown at step 220, this embodiment may also comprise registering the first user to create the first user profile and registering the second user to create the second user profile. As shown at step 230, this embodiment may also comprise providing a notification to at least one of the first user interface or the second user interface of a service event based on the service provider profile.

Figure 2B:
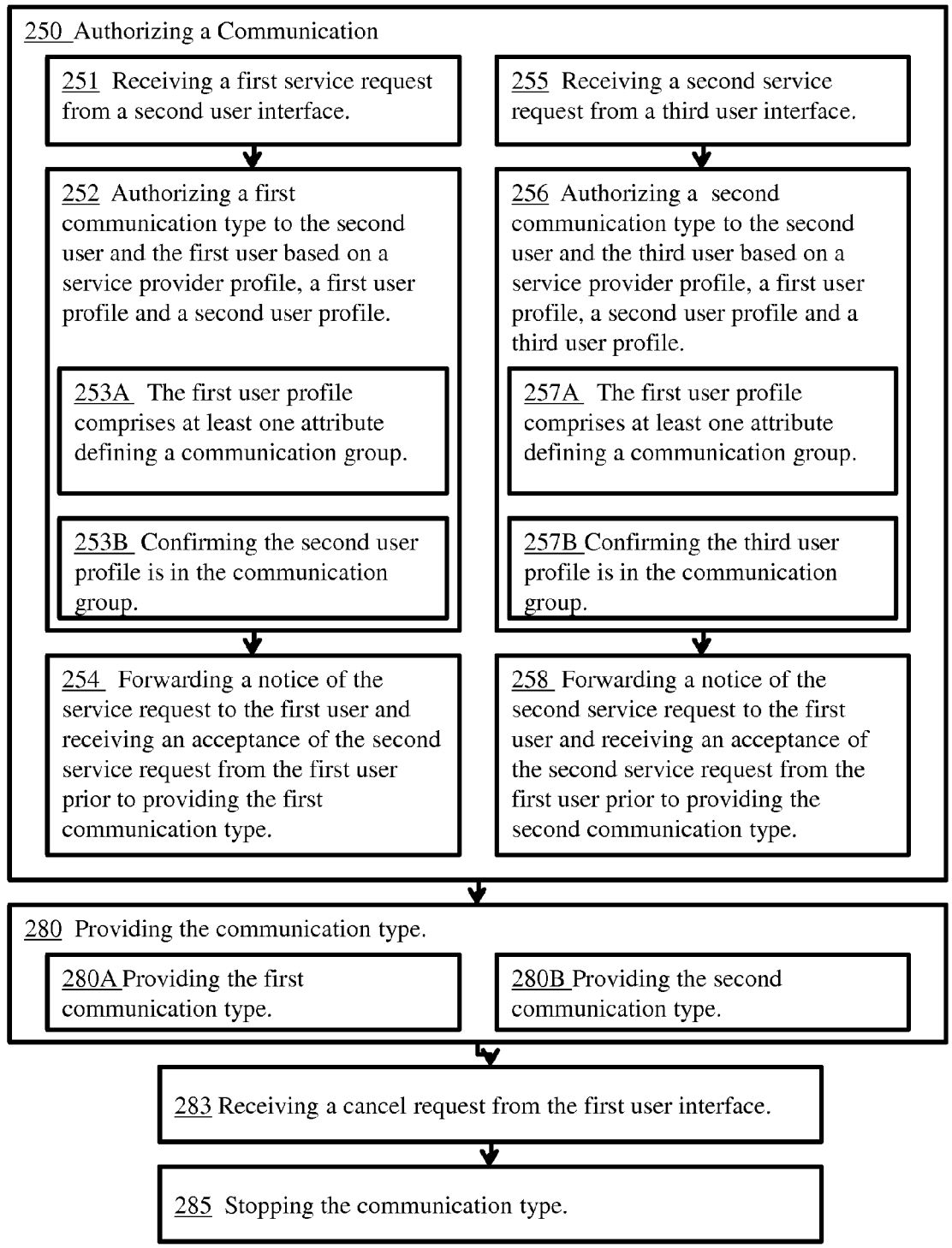
FIG. 2B illustrates a process diagram of another example embodiment of methods of providing remote communications and visitations.

FIG. 2B illustrates how the methods may be performed by one embodiment of the RCV system, from the point of view of the service provider authorizing, providing and stopping the providing of the first communication type. At step 250, the service system authorizes the communication types. This may comprise the steps of receiving a first service request from the second user interface at step 251 and authorizing a first communication type to the second user interface and the first user interface based on a service provider profile, a first user profile and a second user profile at step 252. At step 254 the methods may comprise forwarding a notice of the service request to the first user interface and receiving an acceptance of the second service request from the first user interface prior to providing the second communication type. As shown at step 253A, the first user profile may comprise a plurality of user profile attributes, at least one user profile attribute defining a communication group and at 253B the RCV service methods may further comprise confirming that the second user profile has an attribute reflecting that the second user profile is in or otherwise belongs to the communication group. The embodiment of step 250 may also comprise the steps of receiving a second service request from a third user interface at step 255, authorizing a second communication type to the second user interface and the third user interface based on the service provider profile, the first user profile, the second user profile and a third user profile at step 256. The methods may further comprise and forwarding a notice of the second service request to the first user interface and receiving an acceptance of the second service request from the first user interface prior to providing the second communication type between the second user interface and the third user interface at step 258. As show at step 257A, the first user profile may comprise at least one user profile attribute defining a communication group and at 257B the RCV methods may comprise confirming that the third user profile has an attribute reflecting that the third user profile is in or otherwise belongs to the communication group.

As shown at step 280, this embodiment may also comprise providing the communication type between the user interfaces. As shown at step 280A, the methods may provide the first communication type. This first communication type may be provided between the user interfaces such as between the first user interface and other user interfaces. As shown at step 280B, the methods may also provide the second communication type. This second communication type may be provided between user interfaces such as the interfaces for the second and third user.

Embodiments may further comprise the step of receiving a cancel request from the first user interface to stop the first communication type at step 283 and stopping the providing of the communication type at step 285.

Embodiments may further comprise authorizing the first communication type to the third user interface and the first user interface based on the profiles of the service provider, the third user profile and the communication group, authorizing the second communication type to the third user interface and the second user interface based on the profiles of the service provider and the third user profile and the communication group and providing the second communication type as a communication between the third user interface and the second user interface.

An example of the embodiment of FIG. 2B may comprises the service provider profile being a health care provider profile of a health care provider, the first user interface is associated with the first user profile and the first user profile is associated with of a patient of the health care provider, the second user interface is associated with the second user profile and the second user profile is associated with of a visitor of the patient of the health care provider, the third user interface is associated with the third user profile and the third user profile is associated with of a second visitor of the patient of the health care provider, providing the first communication type comprises providing a one-way image communication and providing the second communication type comprises providing a two-way text communication between the second user interface and the third user interface whereby the first user interface is not provided the second communication type.

FIG. 2C illustrates how some embodiments of the methods may be performed by the RCV system, for example from the point of view of a client device and user interface of a remote visitor receiving a communication as 290. This may comprise the steps of recognizing a second user input to a user interface as a first service request for a first communication type with the first user interface at step 291, communicating the first service request from the second user interface to a service provider at step 292, and receiving the first communication type between the first user interface and the second user interface after the service provider provides a first authorization to receive the first communication type based on a service provider profile of the service provider, a first user profile and a second user profile at step 293. This may also be accomplished by recognizing a second user input to a user interface as a second service request for a second communication type with the first user interface at step 295, communicating the second service request for a second communication type from the second user interface at step 296 and receiving the second communication type between the first user interface and the second user interface after the service provider provides a second authorization to receive the second communication type based on the service provider profile, the first user profile and the second user profile at step 297. The steps above may also be preceded by step 294 which comprises receiving a notification of a service event based on a service provider profile of the service provider or a user profile.

An example of the embodiment in FIG. 2C may comprise the service event being a defined time period for the second communication type, the first communication type being a one-way image communication from the first user interface to the second user interface, the second user interface is a graphic user interface and the second communication type is a two-way image communication between the first user interface and the second user interface. An example embodiment may also comprise the service provider profile being a health care provider profile of a health care provider, the first user interface is associated with a patient of the health care provider, the second user interface is associated with a visitor of the patient and the service event is a time period for allowing the visitor to visit the patient.

Figure 2D:
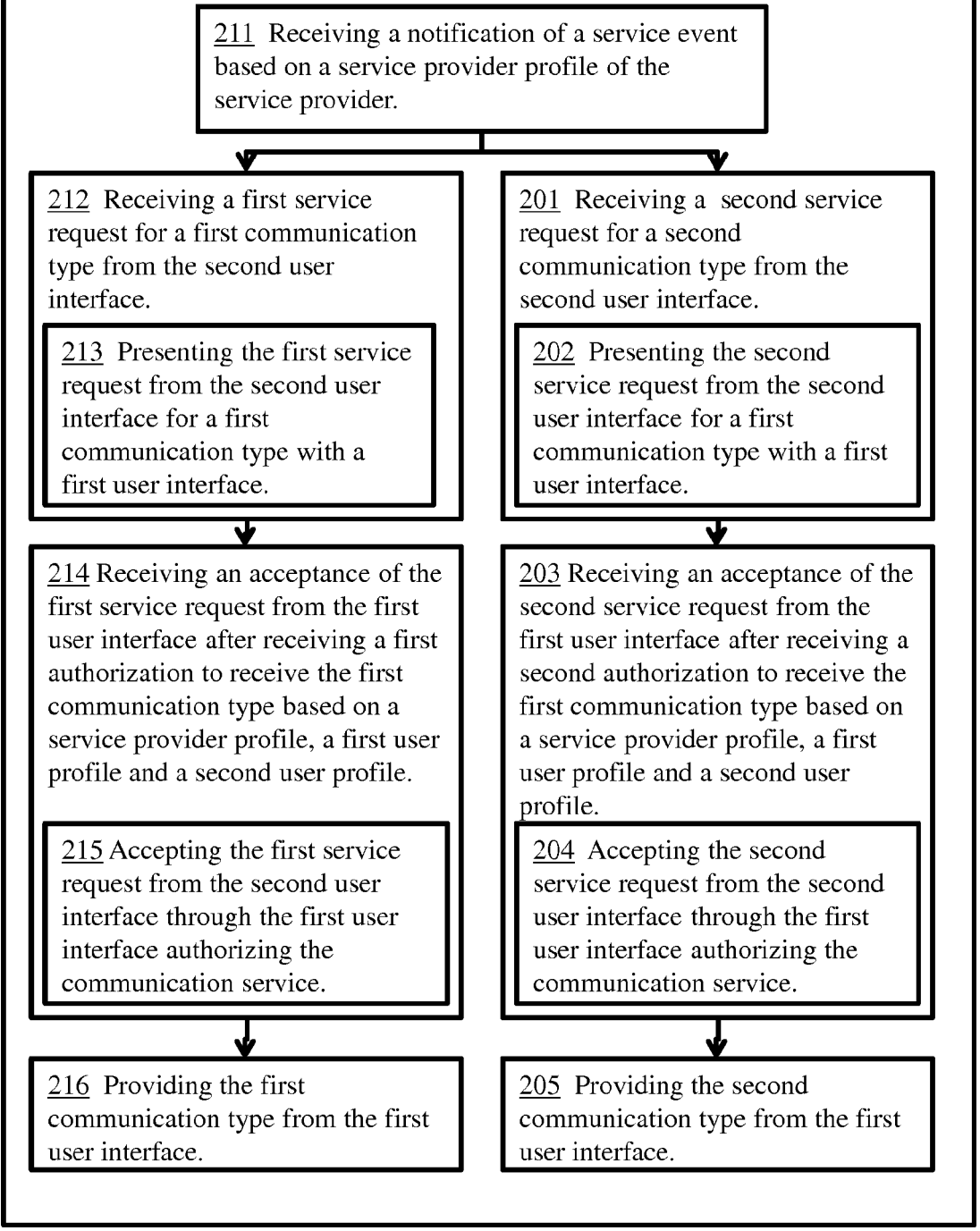
FIG. 2D illustrates a process diagram of example embodiments of providing a communication.

FIG. 2D illustrates how some embodiments of the methods may be performed by the RCV system, for example from the point of view of the client device and user interface of a patient providing a communication at 210. This embodiment may comprise the steps of receiving a service request for the first communication type from the second user at a user interface at step 212, receiving an acceptance of the first service request from the first user interface after receiving a first authorization to receive the first communication type based on a service provider profile, a first user profile and a second user profile at step 214 and providing the first communication type from the first user interface at step 216. The method may further comprise presenting a first service request from a second user for a first communication type with a first user at step 213 and accepting the service request from the second user interface through the first user interface authorizing the communication service at step 215. This embodiment may further comprise the steps of receiving a second service request for a second communication type from the second user at a user interface at step 201, receiving an acceptance of the second service request from the first user interface after receiving a second authorization to receive the second communication type based on the service provider profile, the first user profile and the second user profile at step 203 and providing the second communication type from the first user at step 205. The methods may further comprise presenting the second service request from the second user interface with the first user interface at step 202 and accepting the service request from the second user through the first user interface authorizing the communication service at step 204. The steps above may also be preceded by step 211 which comprises receiving a notification of a service event and the service request is related to the service event. For example, the service event may be a time period allowing that communication type.

An example of the embodiment of 2D may comprise the service provider being a health care facility, the first user interface is associated with a patient in the health care facility, the second user interface is associated with a visitor of the first user and the service event is a visiting time period for the health care facility.

Figure 3:
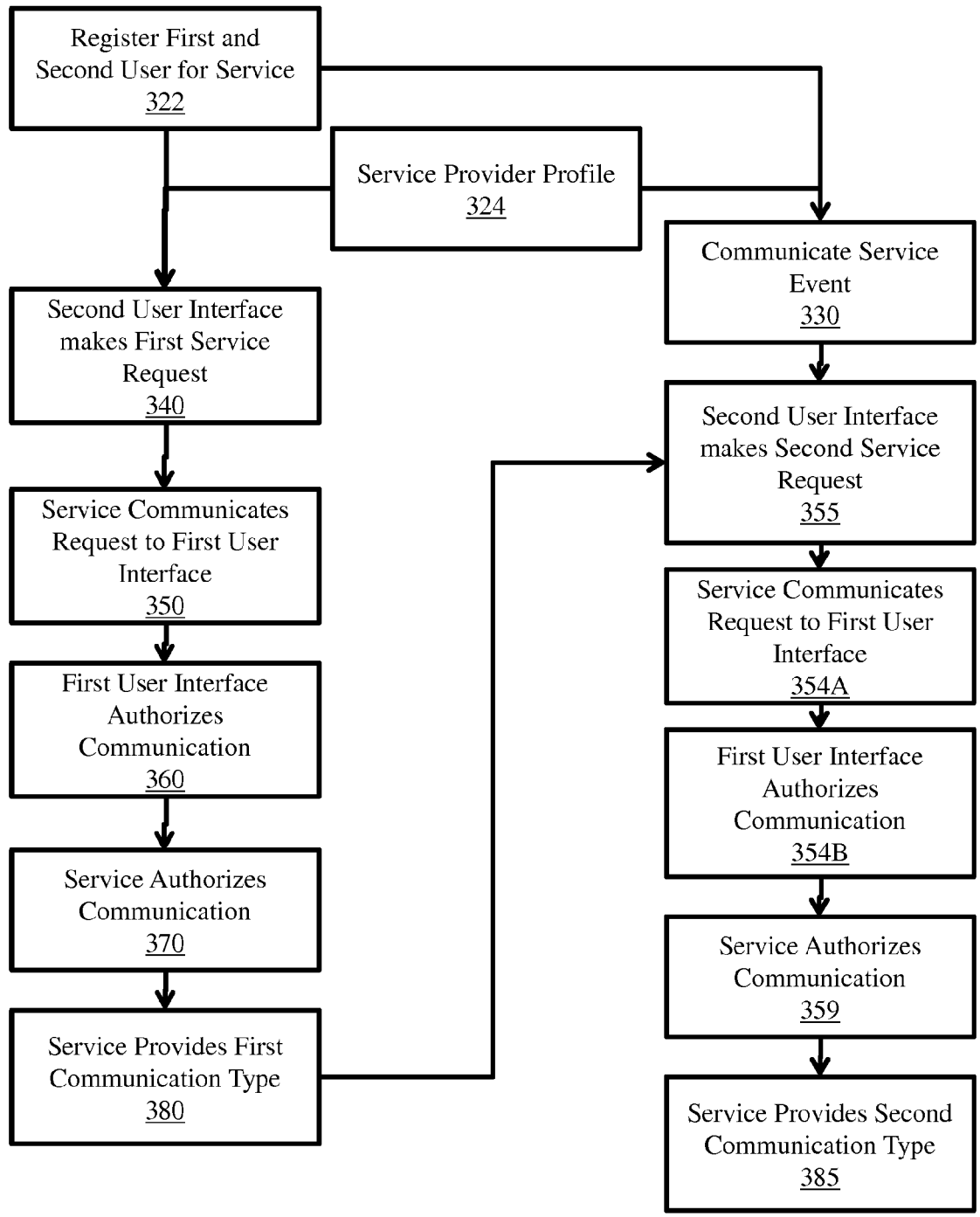
FIG. 3 illustrates a process diagram of another embodiment of the methods of the invention with multiple communication types.

Another Embodiment of Methods of Providing Remote Communications and Visitations (RCV):

Another example embodiment of the RCV methods is shown in FIG. 3. This embodiment may include multiple types of communication.

Figure 6A:
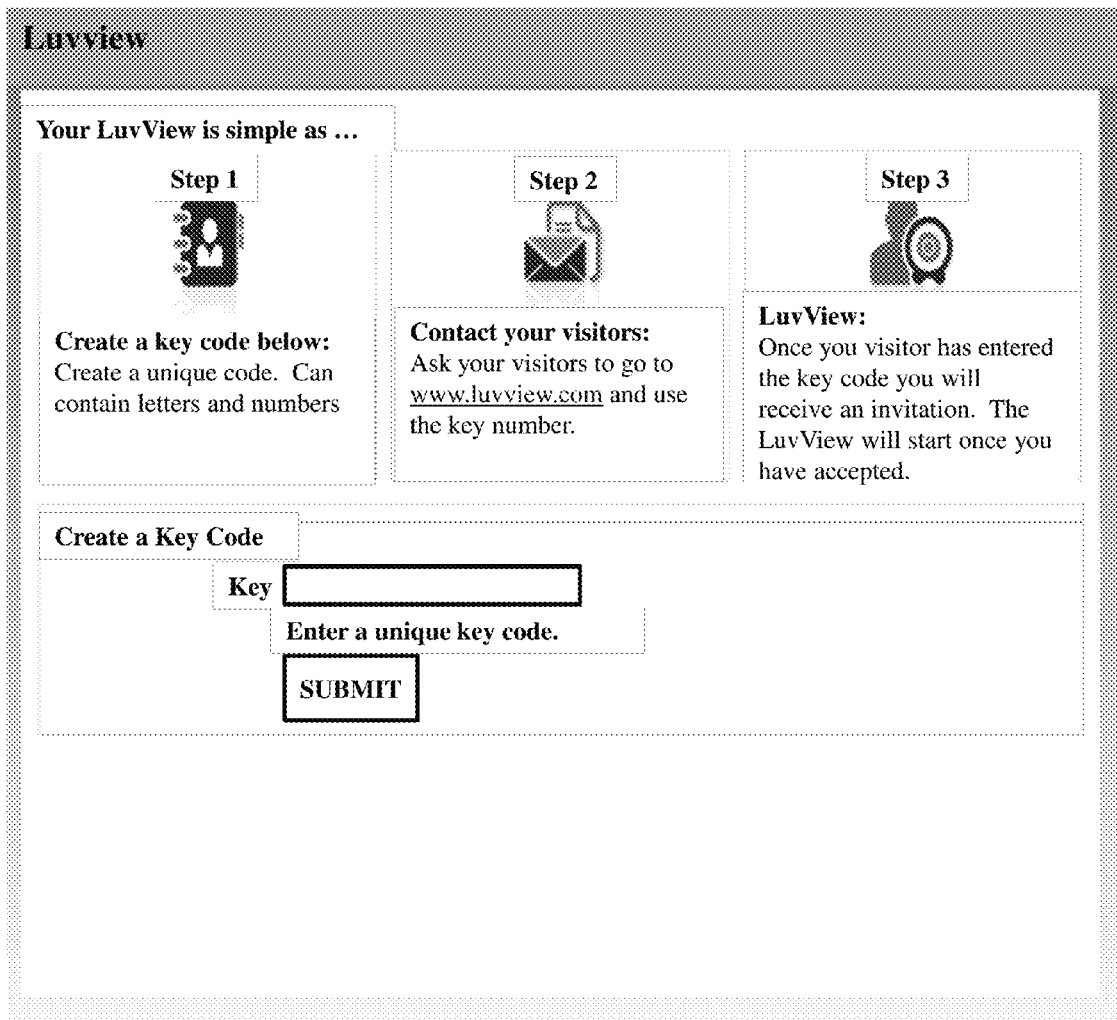
FIG. 6A illustrates one embodiment of a client interface showing steps for a user to register with a remote communication and visitation system.

Similar to the previous embodiments, the users register for the service at step 322. In some embodiments, the first user will be first to register for the service and their profile will function as the super-user profile so that other users associated with the first user will have a profile within permissions set by the first user. The second user's registration may have an authorization check performed by the service before giving them the ability to access communication services. FIG. 6A illustrates one embodiment of a user interface that allows the first user, here a patient in a hospital, to register for the RCV service. As shown in this embodiment, the user creates a key code as one of their user profile attributes for the service. The key code is a user profile attribute that allows them to access the RCV service and it is shared as an attribute with other users to identify and authorize their use as part of the first user's communication group. Once registered, at step 2, the first user can then send notices to other users to use the service. This notice may be forwarded to users, such as by email or text, who are not yet registered for the service. Once users are registered, authorized and associated with a user interface, communication types can be provided. Although not shown, the service may also allow the users to add additional attributes to the user profile that may be used to authorize communication types. Upon registration, default attributes may also be provided as part of the user profile.

In some embodiments, the RCV service may also utilize other information sources to populate the profiles of a user or the service provider. For example, in one embodiment, the methods may utilize predefined data fields from a health care standard, such as the Health Level Seven International (HL7) standard published by Health Level Seven International, Ann Arbor Mich., USA, to define or populate attributes in a user profile of a hospital patient. HL7 standards provide a framework (and related standards) for the exchange, integration, sharing, and retrieval of electronic health information and those HL7 standards are herein incorporated by reference in their entirety. For example, HL7 may include standard message categories such as but not limited to Patient Administration (ADT), Orders (ORMs), Results (ORUs) and Charges (DFTs). In one embodiment, the RCV service may also receive permission from the patient to use the RCV service and for the service to use the patient HL7 data at the hospital to populate and update their user profile. These updates may be used to trigger a notification of a service event for the service. The RCV service can recognize the admissions and discharge (ADT) information as kept by the hospital and keep the profile up to date. This will also allow the RCV service to know which patient is in which bed, when they arrived, when they were discharged, if they moved to another bed etc. The RCV service may tie a patient stay ID from ADT information as a user profile attribute and identified visitors will be added to that patients communication group. The service may tie one communication group for that patient for that stay ID.

In addition to the user registration, the methods may include the service provider configuring other service attributes through a service provider profile at 324. This service provider profile may be pre-defined or defined during or after the user registration. These other attributes may include information related to the service and or the service provider. For the example embodiment of a RCV service between a family member and a hospital patient, the service provider profile may include attributes such as the time zone of either user, the visitation hours of the hospital, a service level purchased by the user as well as special service authorization attributes.

With this embodiment, the second user, as the family member, makes a first service request for a communication type at step 340. This first request is for a first communication type such as a live or intermittent video feed from the first user, the patient.

As described before, the service request is communicated to the patient at step 350 who decides whether to authorize the communication at step 360. This authorization may be an "active" acceptance or authorization provided by the patient or it may be a "passive" authorization applied by the system based on communication preferences provided by the user or based on the service provider configuration provided by the service. The authorization may also be provided by another party, such as a nurse or hospital employee, if the patient is not able to execute an authorization.

Figure 5A:
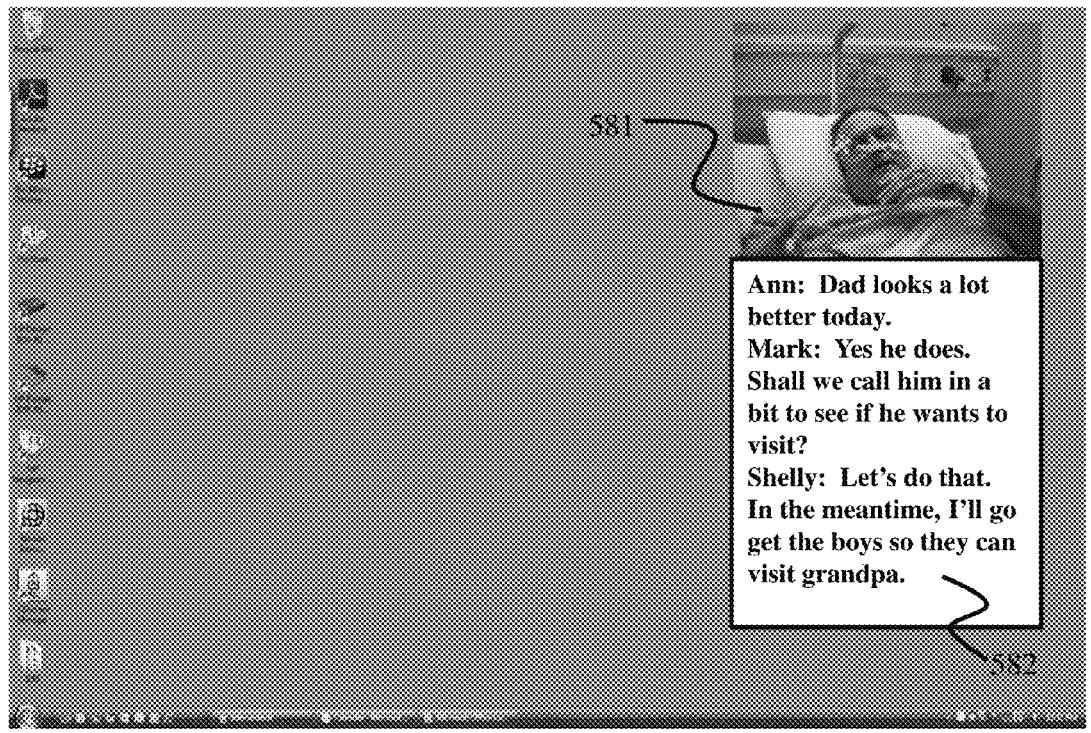
FIGS. 5A and 5B illustrate embodiments of a client interface for a user, here a visitor, according to one embodiment of the invention.

If the patient authorizes the communication, the service authorizes the communication at step 370 then provides the first communication type at step 380. As mentioned, in this embodiment, the first communication type may be a one-way, live or intermittent image feed from the patient. An example of this communication type on the family member client device is shown in FIG. 5A where the first type of communication is the graphic image 581.

Also illustrated with this embodiment is a second communication type.

Figure 5B:
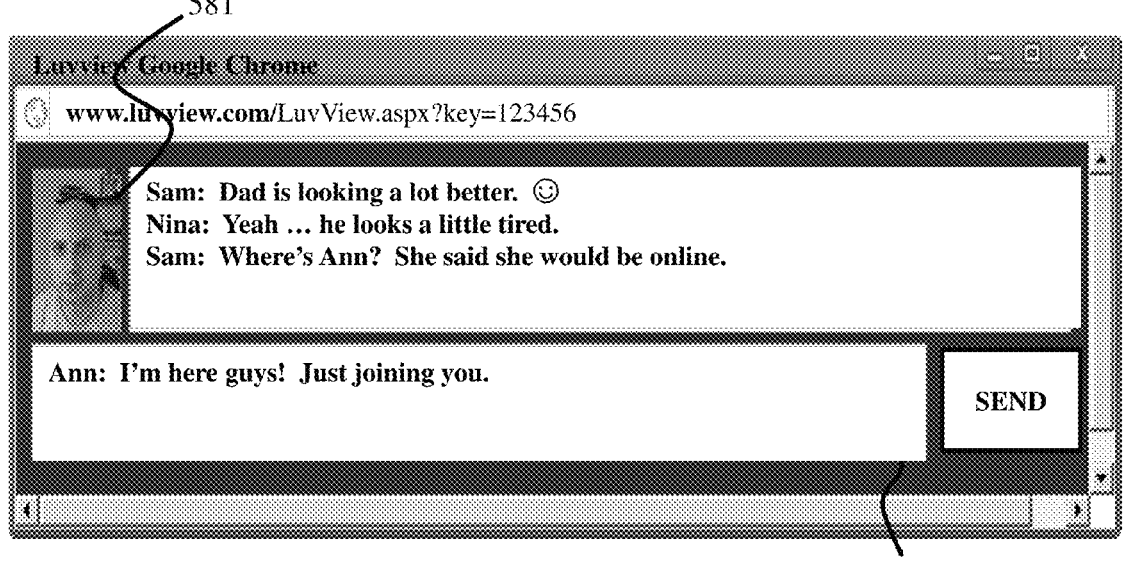

Similar to the methods described above, the second user can make a service request for this second communication type at step 355. This may be the result of the receipt of a notification of a service event at step 330 or any desire for another communication between the two users. An example of the method of requesting is shown in FIG. 5B which illustrates one embodiment of a user interface of the second user, here a family member. In this embodiment, the user interface initially has a representation of an image feed 581. As one way to make a service request, the user clicks on the image feed 581 and it triggers the interface 586 of FIG. 5C that allows the family member to select by clicking on "Send a Luvview Request" interface 587 which will forward the service request for a communication type to the patient.

Figure 5C:
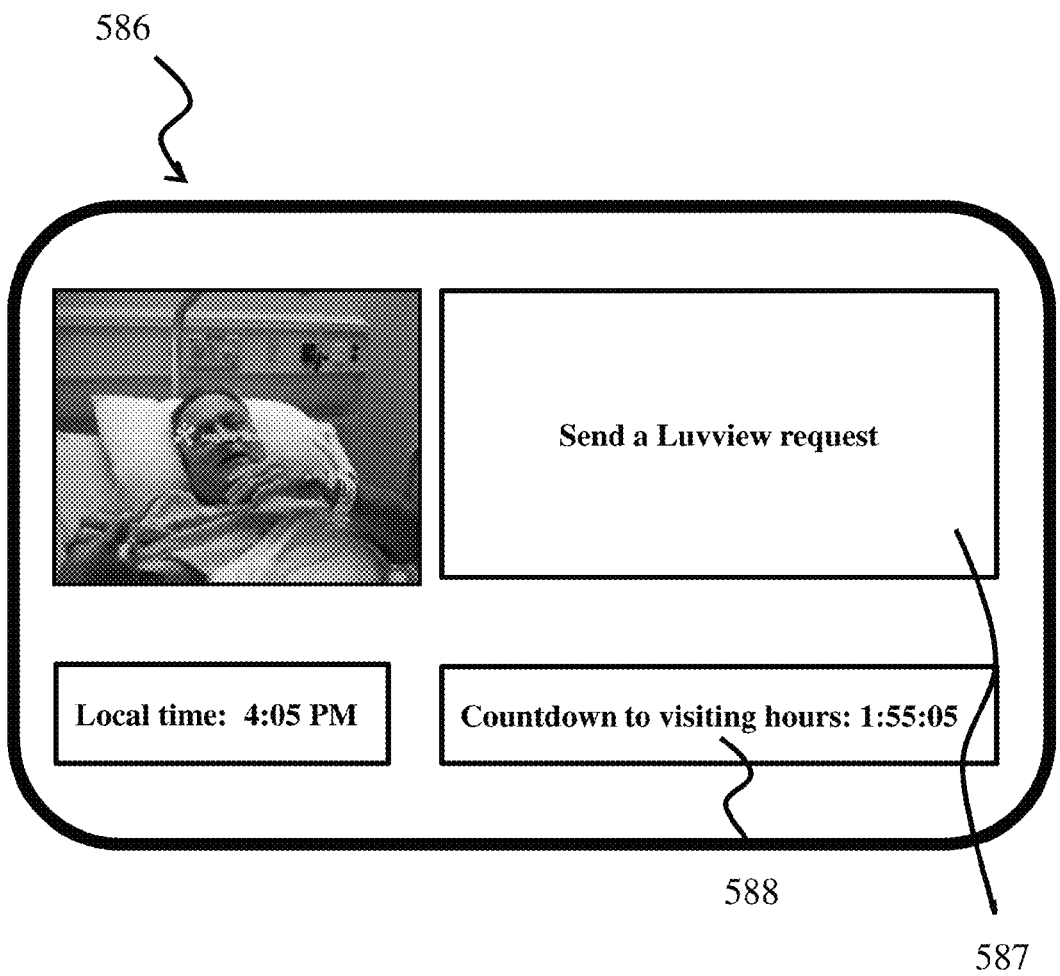
FIG. 5C illustrates one embodiment of a client interface showing an example of how to input a service request.

Also shown in FIG. 5C is the "countdown to visiting hours" interface 588 which represents one type of service event. In this embodiment, the service may be configured to recognize visiting hours for that patient and the RCV system keeps track of that local time so that the system and family members will know when they can request a visit with the patient.

Referring back to FIG. 3, after the second user requests a second communication type at 355, the service authorizes the communication type at 359 and the service provides the second communication type at 385. The service may forward the service request to the first user interface at 354A where the first user is able to decide whether to authorize or accept this communication type. If authorized by the first user interface at 354B, the service authorizes the communication type at 359 and provides the second communication type at 385. The second type of communication may be any type of communication.

Figure 6B:
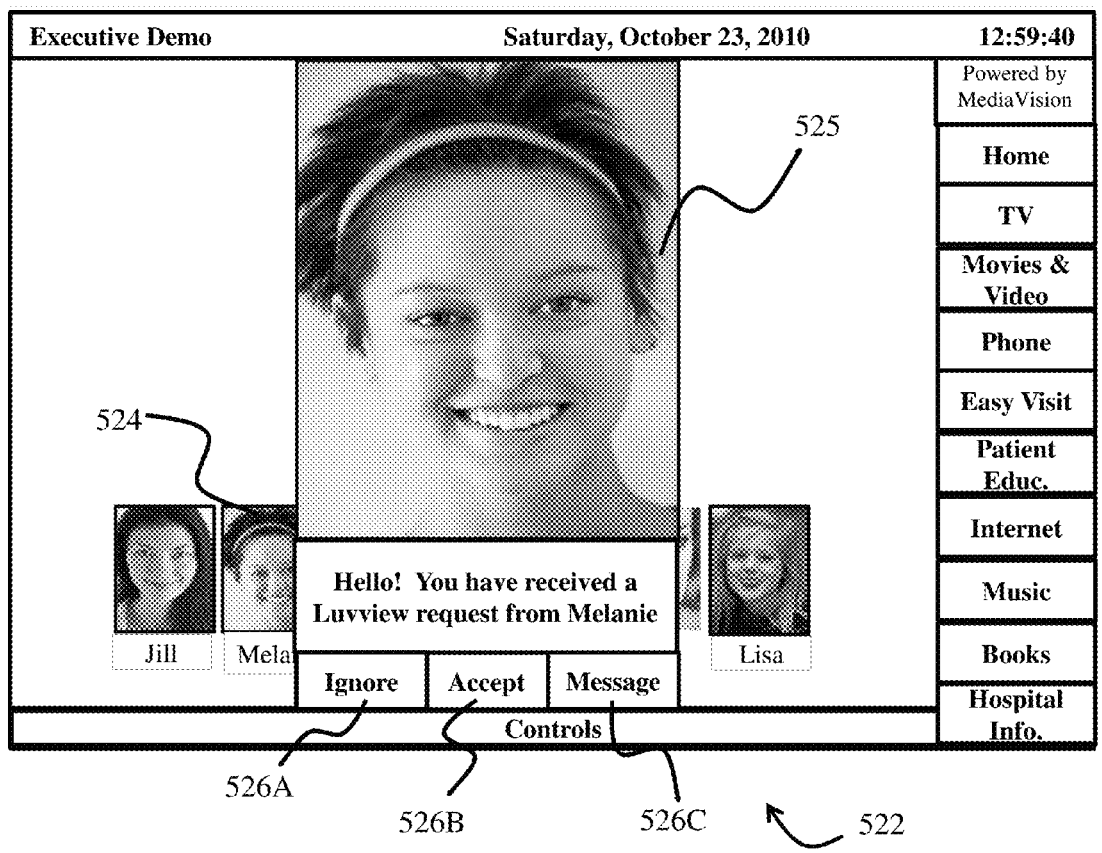
FIGS. 6B and 6C illustrate embodiments of a client interface for a user, here a patient of a health care provider, according to one embodiment of the invention.

FIG. 6B shows an example embodiment of the first client interface for the first user. This interface shows an icon for users that may be utilizing the first communication type or who are authorized to have a communication type. A special icon may be created when a request for another communication type is requested. As shown, user "Melanie" is requesting a "Luvview Request" with the patient. The patient can "accept", "ignore" or "message" as a response for this request. Responding with accept will allow the second communication type, ignore will not let the communication type occur and message may let the patient send another type of message to the family member. In some embodiments, the patient is also able to stop or pause a communication type as well a remove a user from a communication.

Figure 6C:
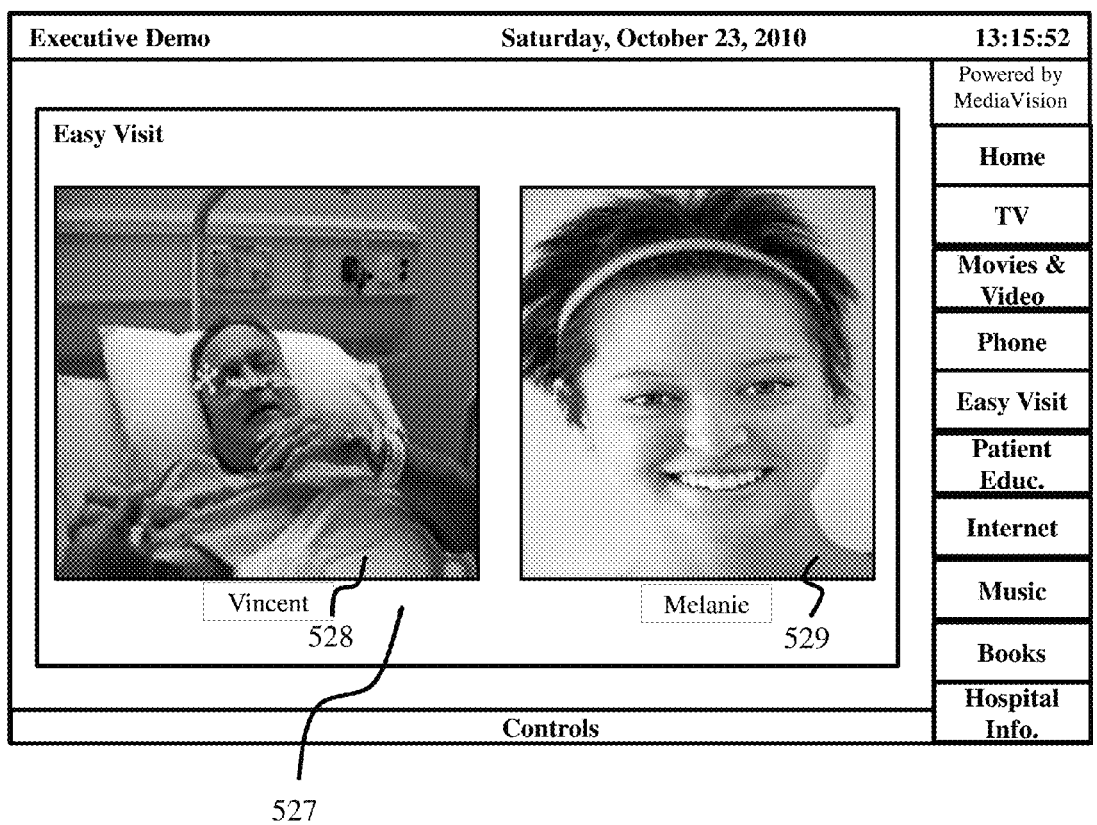

In this embodiment, the second communication type may be a two-way video session between the family member and the patient. FIG. 6C illustrates one embodiment of a client interface showing the two-way video session. In this example, the two-way communication will allow a video conversation between the remote patient and the visiting family member where the patient interfaces with a camera and screen on a processor based device and the visiting family member uses a similar interface as may be on a personal computer.

In this embodiment, it is also possible to have multiple parties involved in the communication. As described above, and illustrated in FIG. 5A, the first communication type (video) also has another communication type (chat) between family members about the patient. This is also shown in FIG. 6B where there are several family members that are able to have communication with the patient.

For embodiments that allow multiple users to communicate with each other, this may include a chat window between family members that does not have to be shown to the patient. For embodiments with multiple family members, the patient may or may not have authorized the conversation between the family members. This allows family members to chat about the patient without the patient knowing details of the conversation. In some embodiments however, the patient is able to control who can have these conversations based on authorizations or communications preferences in their user profile.

Although different communication types are described as being provided after a separate service requests and authorizations, multiple communication types may also be provided upon a single authorization of a communication type. For example, a single authorization may provide a first communication type, a one-way video feed from the patient, at the same time a second communication type, text between multiple visitors, is provided.

Although the above example described communication between users such as a patient and visitors, it is also understood that embodiments of these systems and methods may provide communication between other entities. For example, communication may also be provided between the service provider and the visitors. This may be provided with or without the patient's participation. Communication may also be between equipment and users. For example, in addition to the above communication types, such as a first communication type being a one-way image communication from the patient to the visitor, and a second communication type being a two-way image communication between the patient and the visitor, another communication type may be provided that is a communication of health measures related to the patient that are shared with users. This communication may be provided with or without the patient's interaction or awareness and may be provided alone or as one of multiple communication types. The patient, if they are the user with the super-profile, may include attributes or permissions for these types of communications in their user profile.

Although the above example describes the use of RCV methods between patients and visitors in a health care setting, it is also understood that embodiments of these systems and methods may be used in any environment where remote communication is helpful. One example embodiment may be where remote family members or friends may want to keep a watch on loved ones. For example, the RCV service could be used with a mother (first user) who has had a baby but may be too tired to be involved with a communication but her family (second user) overseas may love to see the newborn using the RCV service. In this example, a web based service provider can provide the service provider profile and functions of the RCV service system.

One Embodiment of the Remote Communications and Visitations System:

The remote communication and visitations (RCV) system generally provides the functionality for the methods discussed earlier to be carried out. And again, for illustration purposes only, one embodiment of the RCV system will be described using an environment of a family member and remote patient wanting to communicate over a data network. It is understood that the systems may be applied to many other service environments as described herein.

In some embodiments, the RCV system generally comprises a service recipient interface, a communication network, a service provider interface and a service provider system. FIG. 4 shows one embodiment of the RCV system 400 where the system generally includes a first user interface 420, a communications network 430, a RCV service system 440 operated by a service provider, and a second user interface 480. In some embodiments, the RCV system also comprises a third user interface 490 capable of communicating with the RCV system and other client interfaces.

The user interfaces 420, 480 and 490 can generally be provided by any type of client device that provides an interface for the recipient of the RCV services. The client device also provides communication between the user and the service system. In one embodiment, the client device is a mobile computing device similar to a laptop computer, iPad, smartphone or digital phone in communication with a data network that is in communication with the service system and the service provider.

The user interfaces 420, 480 and 490 also include a means to access the services of the service provider. This means to access can be an application on the client device such as a common web browser or software client to access a service provider web site, or the means can comprise a custom designed application, such as a proprietary RCV service software application that resides on the client device and provides some RCV service functionality without having to access the communications network.

FIGS. 5A-5C illustrates example embodiments of a user interface as may be used by and associated with a second user, here a visitor. FIG. 5A illustrates one example embodiment of the user interface of the second user interface 480, here a remote visitor. As shown, the user interface may be an application on a processor based computer that displays a window on the computer screen. As shown, the window may include a window showing one communication type; here a video feed 581 of another user such as a patient. The application may also show other communication types such as a text dialog 582. FIG. 5B illustrates another embodiment of a user interface where the communication is provided by an application such as a web browser and the window also shows the video feed 581 and the text dialog 582. FIG. 5C illustrates one example embodiment of the user interface of the second user interface after the user has selected to triggered the interface 586 allowing the second user to select by clicking on "Send a Luvview Request" interface 587 which will forward a request for a communication type with the first user, here the patient.

FIGS. 6A-6C illustrate example embodiments of user interfaces as may be used by and associate with the first user, here a patient. FIG. 6A illustrates one embodiment of a user interface 521 that allows a patient in a hospital to register for the RCV service. FIG. 6B illustrates a patient user interface 522 showing multiple icons 524 representing multiple users authorized and having a first communication request with the patient. Also shown is a pop-up window 525 identifying a service request from a user, here a "Luvview request", and the patient also has selectable icons where they can choose to accept 526A or ignore 526B the request or to send a message 526C in response to the request. FIG. 6C illustrates the patient user interface of FIG. 6B after having accepted the service request from the user Melanie. Shown is an example of two-way chat dialog 527 between the patient, identified by window 528, and the visitor identified by window 529.

Referring back to FIG. 4, the communication network 430 can be any type of communications network that allows the client device to communicate with the services of the service provider. In one embodiment, the communications network is a data network capable of providing communications over a data network such as the Internet.

The service provider utilizes the RCV service system 440 to carry out methods discussed earlier. One embodiment of the RCV system generally comprises a processor 442 in communication with a data repository or memory 444 capable of storing and retrieving processor executable instructions in a computer program or program product 460. In this embodiment, the RCV service system 440 can be accessed by a service provider device 448 as may be needed for configuration or systems management or for outputting system data. Through this system, the service provider is capable of registering, activating, maintaining and terminating service for any client device. One embodiment of the RCV service system computer program 460 is detailed below.

The various method embodiments of the RCV system and RCV service system can be implemented in hardware, software, or a combination of hardware and software. Any kind of computer/server system(s), or other apparatus adapted for carrying out the methods described herein, is suited. A typical combination of hardware and software could be a general-purpose computer executing a sequence of program instructions for carrying out the steps of the methods described herein, assuming all required data for processing is accessible to the computer, which sequence of program instructions may be embodied in a computer program product comprising a non-transitory computer-readable medium storing the program instructions. The term non-transitory computer-readable media or medium comprises all computer-readable media or medium with the sole exception of a transitory, propagating signal. Alternatively, a specific use computer, containing specialized hardware for carrying out one or more of the methods of the invention, could be utilized.

Embodiments of the present invention, or aspects of the invention, may also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 7:
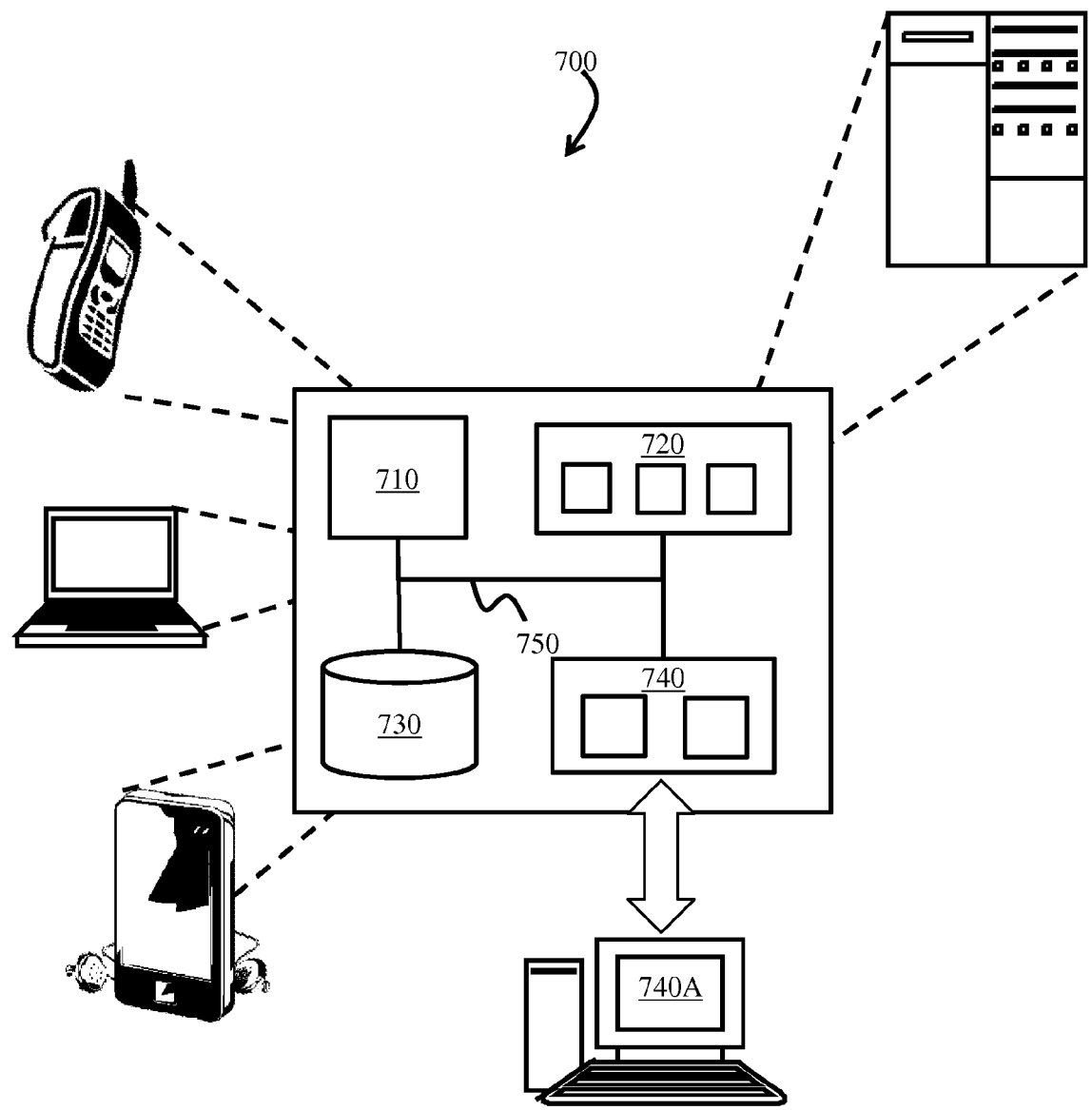
FIG. 7 illustrates one embodiment of a processor based embodiment of a remote communications and visitation system.

FIG. 7 is a schematic diagram of one embodiment of a general computer system 700. The processor based computer system 700 can be used for the operations described in association with any of the computer/processor based methods described herein. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored as a computer program in the memory 720 or on the storage device 730 to display information for a user interface on the input/output device 740.

The memory 720 stores information within the system 700. In some implementations, the memory 720 is a computer-readable storage medium. In one implementation, the memory 720 is a volatile memory unit. In another implementation, the memory 720 is a non-volatile memory unit.

The storage device 730 is capable of providing mass storage for the system 700. In some implementation, the storage device 730 is a computer-readable storage medium. In various different implementations, the storage device 730 may be a floppy disk device, a thumb drive, a hard disk device, an optical disk device, or a tape device. The program product may also be stored on hard disk drives within the computer or it may be located on a remote system such as a server, coupled to processing unit, via a network interface, such as an Ethernet interface.

The input/output device 740 provides input/output operations for the system 700 and may be in communication with a user interface 740A as shown. In one implementation, the input/output device 740 can include a keyboard, touchscreen and/or pointing device. In another implementation, the input/output device 740 includes a monitor or other display unit for displaying output and graphical user interfaces.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or be incorporated in, ASICs (application-specific integrated circuits). Computer readable mediums may also be encoded with computer programming logic such as a computer program product that when executed by a process in a processor based device provide the methods described herein.

Some embodiments described may be implemented in digital electronic circuitry, or in computer hardware, firmware, software, or in combinations of them such as but not limited to digital phone, cellular phones, laptop computers, tablet computers, desktop computers, digital assistants, iPods, iPads, servers or server/client systems.

Some embodiments may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

Some embodiments of the computer system may include clients and servers. A client and server are generally remote from each other and typically interact through a network, such as the described one. The relationship of client and server arises by virtue of computer programs running on the respective computers and having a client-server relationship to each other.

Figure 8:
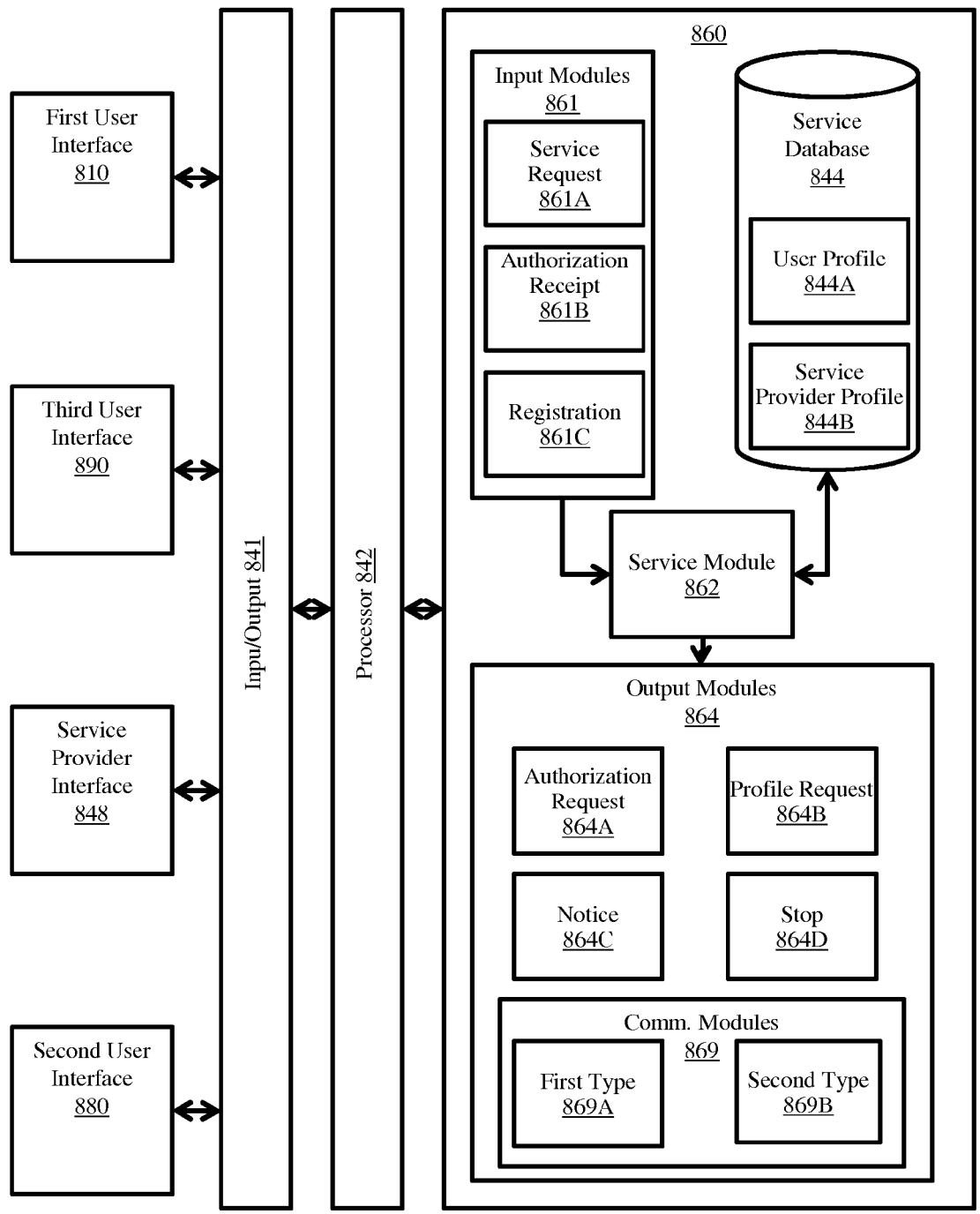
FIG. 8 illustrates one embodiment of a computer program product according to one embodiment of the remote communications and visitation system.

A functional diagram of one embodiment of the computer program capable of executing the described methods is shown in the functional diagram in FIG. 8.

As shown, access to the computer program is provided by a first user interface 810, a second user interface 880, a third user interface 890, and a service provider interface 848 interacting with an input/output device 841 and processor 842 communicating with computer program 860.

Utilizing the example embodiment of FIG. 3, the means for receiving a service request may be by having the computer program receive a communication request from the first user interface through an input/output device 841 configured to communicated to an input module 861 of which one is a communication request module 861A. This request is communicated to the service module 862 which is configured to use the database 844 to associate service requests with other users, with user profiles 844A and with service provider profile 844B. The means for authorizing the communications service comprises the service module 862 configured to perform functions similar to a database lookup to compare fields of the communication request with attributes in the user profiles 844A or service provider profile 844B in the service database 844. The database may have predetermined authorization fields or it may require authorization for each service request or other input type. The service module 862 is configured to use the service request attributes and the data from the service database to correlate the request into an output type to be communicated by the output modules 864. Examples of suitable output modules 664 include, but are not limited to an authorization request 864A configured to request authorization from the first user, a profile request 864B to allow users to configure their user profiles 844A (such as who is able to communicate with who), a notice module 864C configured to communicate a notice of a service event, a stop module 864D configured to stop the providing of a communication type and communication modules 869 configured to allow different types of communication types (for example only 869A and 869B) between the users. Means for providing the communications type between users can be, but is not limited to the communication modules 869 configured to allow common communication means such as Skype, video conferencing, instant messaging, text, audio conferencing or any other type of remote communications.

Other input modules 861 include an authorization receipt module 861B configured to receive the first user's authorization and a registration module 861C configured to receive registration information from any of the service interfaces. Other input modules may be provided such as a cancel request module configured to communication a request to stop providing the communication or other modules to implement other RCV system features.

The first user interface 810 may include those features shown in FIGS. 5A-5C.

The second user interface 880 may include those features shown in FIGS. 6A-6C.

Although the computer program has shown using a client-server architecture with several functional modules being provided at the server level, it is well understood that portions of the computer program may instead be included in each of the client interfaces and still provide the same type of services.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A processor based method of providing a communication between a first user interface and a second user interface, the method comprising:
   receiving a first service request from the second user interface;
   a first user profile stored in a service database comprising at least one user profile attribute of a first user;
   the first user is a patient in a health care facility;
   the at least one user profile attribute of the first user comprising an authorization for a second user to have a first communication type with the first user;
   a service provider profile stored in a service database comprising a plurality of service provider profile attributes of a service provider;
   the plurality of service provider profile attributes comprises a time period for limiting the first communication type between a first user interface and the second user interface;
   authorizing the first communication type to the second user interface and the first user interface based on a comparison of the service provider profile, the first user profile and a second user profile;
   providing the first communication type as a communication between the first user interface and the second user interface; and
   the communication between the first user interface and the second user interface corresponds to the first communication type.

2. The processor based method of claim 1 wherein:
   the plurality of service provider profile attributes comprises a plurality of tiers of a service the first user registers for.

3. The processor based method of claim 1 wherein:
   at least one of the at least one user profile attribute of the first user defines a communication group comprising a plurality of user profiles;
   the second user profile comprises a plurality of second user profile attributes stored in the service database; and
   the step of authorizing the first communication type to the second user interface and the first user interface based on a comparison of the service provider profile, the first user profile and the second user profile further comprises confirming that at least one of the plurality of second user profile attributes of the second user profile is in the communication group.

4. The processor based method of claim 3 wherein:
   the step of authorizing the first communication type further comprises:
      forwarding a notice of the first service request to the first user interface; and
      receiving an acceptance of the first service request from the first user interface.

5. The processor based method of claim 3 wherein the communication group identifies a plurality of user profiles including at least the second user profile.

6. The processor based method of claim 3 further comprising:
   authorizing the first communication type to a third user interface and the first user interface based on the service provider profile, the communication group and a third user profile;
   authorizing a second communication type to the third user interface and the second user interface based on the service provider profile, the communication group and the third user profile; and
   providing the second communication type as a communication between the third user interface and the second user interface.

7. The processor based method of claim 6 wherein:
   the service provider profile comprises a health care provider profile of the health care facility;
   the first user interface is associated with the first user profile and the first user profile is associated with the first user;
   the second user interface is associated with the second user profile and the second user profile is associated with of a visitor of the patient of the health care facility;
   the third user interface is associated with the third user profile and the third user profile is associated with a second visitor of the patient of the health care facility;
   providing the first communication type comprises providing a one-way image communication; and
   providing the second communication type comprises providing a two-way text communication between the second user interface and the third user interface whereby the first user interface is not provided the second communication type.

8. The processor based method of claim 1 further comprising providing a notification to at least one of the first user interface or the second user interface of a service event based on one of the service provider profile or the first user profile.

9. The processor based method of claim 1 further comprising:
   registering the first user to create the first user profile;
   registering a second user to create the second user profile;
   associating the first user profile with the first user interface;
   associating the second user profile with the second user interface; and
   the step of authorizing the first communication type based on a service provider profile comprises comparing the first service request to at least one of the plurality of service provider profile attributes.

10. The processor based method of claim 1 further comprising:
    receiving a second service request from the second user interface for a second communication type between the second user interface and the first user interface;
    authorizing the second communication type based on a comparison of the service provider profile, the first user profile and the second user profile; and
    providing the second communication type between the first user interface and the second user interface.

11. The processor based method of claim 10 wherein:
    the step of authorizing the second communication type is further based on a service event based on the service provider profile;
    the service provider profile comprises a health care facility profile of the health care facility;
    the first user interface is associated with the first user profile and the first user profile is associated with the patient of the health care facility;
    the second user interface is associated with the second user profile and the second user profile is associated with of a visitor of the patient of the health care provider;
    the service event is a time period for allowing the visitor to visit the patient;
    the first communication type is a one-way communication type from the first user interface to the second user interface; and the second communication type is a two-way communication type between the second user interface and the first user interface.

12. The processor based method of claim 11 wherein:
the first communication type comprises a one-way image communication from the patient to the visitor;
the second communication type comprises a two-way image communication between the patient and the visitor; and
the one-way image communication further comprises a streaming communication of one or more health measures of the patient.

13. A processor based method for providing a communication between a first user interface and a second user interface, the method comprising:
recognizing a second user input to a second user interface as a first service request for a first communication type with the first user interface for a first user;
the first user is a patient in a health care facility;
communicating the first service request from the second user interface to a service provider;
receiving the first communication type as a communication between the first user interface and the second user interface after the service provider provides a first authorization to receive the first communication type based on a comparison of a service provider profile of the service provider, a first user profile and a second user profile;
the communication between the first user interface and the second user interface corresponds to the first communication type;
the service provider profile and the first user profile stored in a service database;
wherein the service provider profile comprises a plurality of service provider profile attributes of the service provider; and
the plurality of service provider profile attributes comprises:
a time period for limiting the first communication type between the first user interface and the second user interface.

14. The processor based method of claim 13 further comprising:
receiving a notification of a service event based on the service provider profile; communicating a second service request for a second communication type from the second user interface; and
if the service provider profile provides a second authorization to receive the second communication type based on the service provider profile, the first user profile and the second user profile then providing the second communication type between the first user interface and the second user interface after.

15. The processor based method of claim 14 wherein:
the service event is a defined time period for the second communication type;
the first communication type is a one-way image communication from the first user interface to the second user interface;

the second user interface is a graphic user interface; and
the second communication type is a two-way image communication between the first user interface and the second user interface.

16. The processor based method of claim 13 wherein:
the service provider profile comprises a health care provider profile of the health care facility;
the first user interface is associated with the patient;
the second user interface is associated with a visitor of the patient; and
the plurality of service provider profile attributes further comprise a time period for allowing the first communication type between the first user interface and the second user interface.

17. A processor based method, the method comprising:
receiving a first service request from a second user interface for a first communication type with a first user interface;
receiving an acceptance of the first service request from the first user interface after receiving a first authorization to receive the first communication type based on a comparison of a service provider profile stored in a service database, a first user profile stored in the service database and a second user profile;
the first user interface is associated with a patient in a health care facility;
wherein the service provider profile comprises a plurality of service provider profile attributes of a service provider;
the plurality of service provider profile attributes comprises a time period for allowing the first communication type between the first user interface and the second user interface;
providing the first communication type as a communication from the first user interface to the second user interface; and
the communication from the first user interface and the second user interface corresponds to the first communication type.

18. The processor based method of claim 17 further comprising:
presenting the first service request for the first communication type from the second user interface; and
accepting the first service request from the second user interface through the first user interface authorizing the first communication type.

19. The processor based method of claim 18 further comprising;
receiving a notification of a service event;
the first service request is related to the service event; and
the service event is a time period allowing the first communication type.

20. The processor based method of claim 19 wherein:
the service provider is the health care facility;
the second user interface is associated with a visitor of a first user; and
the service event is the time period for allowing the first communication type between the first user interface and the second user interface at the health care facility.

* * * * *